US009221235B1

(12) United States Patent
Rotter et al.

(10) Patent No.: US 9,221,235 B1
(45) Date of Patent: *Dec. 29, 2015

(54) SYSTEMS AND METHODS FOR ASSEMBLING STIFFENED COMPOSITE STRUCTURES

(71) Applicant: The Boeing Company, Seal Beach, CA (US)

(72) Inventors: Daniel M. Rotter, Lake Forest Park, WA (US); Brad A. Coxon, Everett, WA (US); Brian G. Robins, Renton, WA (US)

(73) Assignee: The Boeing Company, Chicago, IL (US)

( * ) Notice: Subject to any disclaimer, the term of this patent is extended or adjusted under 35 U.S.C. 154(b) by 375 days.

This patent is subject to a terminal disclaimer.

(21) Appl. No.: 13/733,036

(22) Filed: Jan. 2, 2013

(51) Int. Cl.
B29C 65/00 (2006.01)
B32B 37/00 (2006.01)
B32B 37/10 (2006.01)

(52) U.S. Cl.
CPC ..................... B32B 37/10 (2013.01)

(58) Field of Classification Search
CPC B29C 65/00; B29C 66/00145; B29C 66/004; B29C 66/0042; B29C 66/005; B29C 66/0002; B29C 70/30; B29C 70/34; B29C 70/345; B29C 70/86; B29C 70/32; B29C 70/681; B29C 70/38; B32B 37/00; B32B 37/10; B32B 37/1018; B64C 1/06; B64C 1/061; B64C 1/064; B64C 1/068; B64C 1/069; B64C 1/12; B64C 3/18; B64C 3/182; B64C 3/20; B64C 3/24; B64C 3/26

USPC .......................................................... 156/566
See application file for complete search history.

(56) References Cited

U.S. PATENT DOCUMENTS

| 4,980,013 | A | 12/1990 | Lowery |
| 7,459,048 | B2 * | 12/2008 | Pham et al. ................... 156/173 |
| 7,597,772 | B2 * | 10/2009 | Martinez Cerezo et al. . 156/169 |
| 2009/0320292 | A1 | 12/2009 | Brennan et al. |
| 2010/0239865 | A1 * | 9/2010 | Kallinen .................... 428/411.1 |
| 2013/0036922 | A1 * | 2/2013 | Stewart et al. .................. 100/35 |

OTHER PUBLICATIONS

U.S. Appl. No. 13/626,452, filed Sep. 25, 2012, Robins et al.
U.S. Appl. No. 13/732,961, filed Jan. 2, 2013, Rotter et al.

* cited by examiner

Primary Examiner — Christopher Schatz
Assistant Examiner — Matthew Hoover
(74) Attorney, Agent, or Firm — Dascenzo Intellectual Property Law, P.C.

(57) ABSTRACT

Methods of assembling a stiffened composite structure include loading a stiffener onto an inner mold line layup mandrel; positioning a filler structure on an upper side of a filler location tool; following the loading and the positioning, locating, with the filler location tool, the filler structure within the stiffener cavity of the stiffener; repeating the loading, the positioning, and the locating to load a plurality of stiffeners and filler structures; and following the repeating, affixing a skin segment over the plurality of filler structures and to the plurality of stiffeners to form at least a portion of the stiffened composite structure. Systems for assembling stiffened composite structures include a supply of stiffeners; a supply of filler structures; an inner mold line layup mandrel; and a filler location tool configured to locate a filler structure within the stiffener cavity of a stiffener that is loaded onto the mandrel.

20 Claims, 5 Drawing Sheets

SYSTEMS AND METHODS FOR ASSEMBLING STIFFENED COMPOSITE STRUCTURES

FIELD

The present disclosure relates to the assembly of stiffened composite structures.

BACKGROUND

Stiffened composite structures are structures that are constructed of composite materials, such as fiber reinforced composite materials, and typically include some form of structural frame that carries a skin. Some modern aircraft fuselages are examples of stiffened composite structures that include a skin operatively coupled to frame members that extend circumferentially around and that are spaced longitudinally along the inside of the fuselage and stringers that extend longitudinally along and that are spaced circumferentially around the inside of the fuselage. Typically, stiffened composite fuselages are constructed utilizing an inner mold line layup mandrel that includes stringer cavities, or forms, that extend longitudinally along the mandrel. Working from the top of the inner mold line layup mandrel, stringers are hand positioned in the stringer cavities. Typical stringers, such as hat-shaped stringers, define cavities themselves, with these cavities needing to be filled with a structure that will result in a flush surface to which the skin may be applied. These filler structures often are referred to as stringer mandrels or stringer bladders. In addition to the stringer mandrels, radius fillers, or noodles, are used at the interfaces between the outer most edges of the stringer mandrels and the stringers to ensure a smooth transition between the outer surfaces of the stringer mandrels and the stringer flanges to which the skin will be applied. Following their placement, the stringer mandrels and noodles are vacuum compacted in batches so that the stringer mandrels and noodles remain in place for subsequent application of the skin. The vacuum compacting process utilizes a gas-impermeable flexible sheet of material that extends across the outer surface of the inner mold line layup mandrel and that is sealed to the inner mold line layup mandrel around the outer perimeter of the stringers and associated stringer mandrels and noodles that are being compacted. A vacuum is then applied between the sheet of material and the inner mold line layup mandrel to compress the stringer mandrels into the stringers. This process is referred to in the aerospace industry as "bagging." The loading of the stringers and the installation of the stringer mandrels and noodles, as well as the bagging process and the compacting process, are performed on the upper side of the inner mold line layup mandrel, which for a fuselage of a commercial aircraft, can be very large. Moreover, these processes are all labor and time intensive.

SUMMARY

Systems and methods for assembling stiffened composite structures are disclosed herein. Methods according to the present disclosure include providing a supply of stiffeners; providing a supply of filler structures; loading a respective stiffener from the supply of stiffeners onto an inner mold line layup mandrel; positioning a respective filler structure from the supply of filler structures on an upper side of a filler location tool; following the loading and the positioning, locating, with the filler location tool, the respective filler structure within the stiffener cavity of the respective stiffener; repeating the loading, the positioning, and the locating to load a plurality of stiffeners onto the inner mold line layup mandrel and to locate a plurality of filler structures within the stiffener cavities of the plurality of stiffeners; and following the repeating, affixing a skin segment over the plurality of filler structures and to the plurality of stiffeners loaded on the inner mold line layup mandrel to form at least a portion of the stiffened composite structure. Systems according to the present disclosure include a supply of stiffeners; a supply of filler structures; an inner mold line layup mandrel; and a filler location tool configured to locate a respective filler structure from the supply of filler structures within a respective stiffener cavity of a respective stiffener that is loaded onto the inner mold line layup mandrel.

DESCRIPTION

Figure 1:
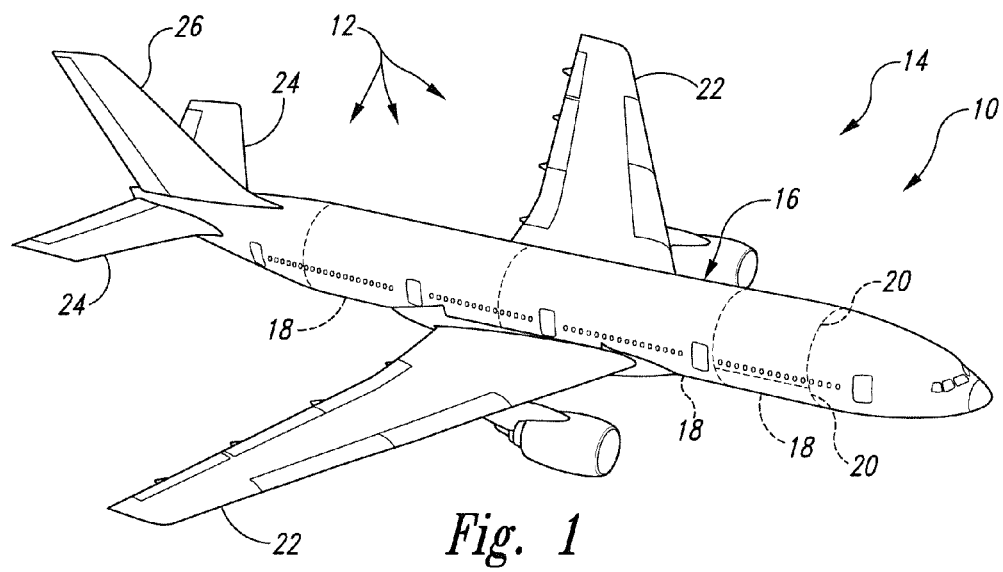
FIG. 1 is a perspective view of an illustrative, non-exclusive example of a stiffened composite structure in the form of an aircraft.

Methods and systems for assembling stiffened composite structures, as well as stiffened composite structures themselves and apparatuses constructed of stiffened composite structures, are disclosed herein. In FIG. 1, an example of an apparatus 10 that may be constructed from stiffened composite structures 12 is provided in the form of an aircraft 14; however, other apparatuses 10 are within the scope of the present disclosure, and the present disclosure is not limited to aircraft and aircraft applications. For example, as illustrative, non-exclusive examples, other apparatuses 10 that may be constructed of stiffened composite structures 12 include (but are not limited to) spacecraft, watercraft, land vehicles, wind turbines, structural towers and masts, etc. Moreover, aircraft 14 may take any suitable form, including commercial aircraft, military aircraft, private aircraft, or any other suitable aircraft. While FIG. 1 illustrates aircraft 14 in the form of a fixed wing aircraft, other types and configurations of aircraft are within the scope of aircraft 14 according to the present disclosure, including (but not limited to) helicopters.

Aircraft 14 include a fuselage 16, which generally corresponds to the main body of the aircraft 14 for holding passengers, crew, cargo, and/or equipment, for example, depending on the particular configuration and/or function of an aircraft 14. Typically, although not required, the fuselage 16 of an aircraft 14 is elongate and somewhat cylindrical or tubular. In some embodiments, the fuselage 16 may be constructed of multiple sections 18 that are longitudinally spaced along the fuselage 16 and operatively coupled together to define the fuselage 16. As used herein when referencing an aircraft 14, a fuselage 16, and/or a corresponding stiffened composite structure 12, the longitudinal direction refers to the fore-aft direction, corresponding to a longitudinal, or long, axis, of the fuselage 16. Additionally, the terms "inner" and "outer" when used in connection with an aircraft 14, a fuselage 16, and/or a corresponding stiffened composite structure 12 refer to the radially inward side and the radially outward side, respectively, of the corresponding stiffened composite structure. Accordingly, the outer side of a fuselage 16 or a component part thereof generally faces away from the fuselage 16, and the inner side of a fuselage 16 or a component part thereof generally faces the internal volume that is defined by the fuselage 16. Similar relative terms may be used with respect to stiffened composite structures 12 other than fuselages 16 and with respect to apparatuses 10 other than aircraft 14.

In FIG. 1, three fuselage sections 18 are indicated schematically; however, any number or size and shape of sections 18 may be used to construct a fuselage 16. Sections 18 additionally or alternatively may be referred to as barrel sections 18 of a fuselage 16, with each barrel section 18 generally defining a length of the fuselage 16. Additionally or alternatively, as schematically illustrated in FIG. 1, a section 18 may include, or be constructed of, more than one subsection 20. In the schematically illustrated and optional example of FIG. 1, a section 18 is shown schematically and optionally to include an upper subsection 20 and a lower subsection 20; however, a section 18 may be constructed of any suitable number, configuration, and placement of subsections 20, including no subsections 20 at all.

Aircraft 14 also may include wings 22, horizontal stabilizers 24, and a vertical stabilizer 26, each of which may be constructed as a unitary structure or in subsections that are subsequently assembled together. One or more of a fuselage 16, a fuselage section 18, a fuselage subsection 20, a wing 22, a horizontal stabilizer 24, a vertical stabilizer 26, or a structural subsection thereof may be constructed of and/or may be described as a stiffened composite structure 12 according to the present disclosure.

Figure 2:
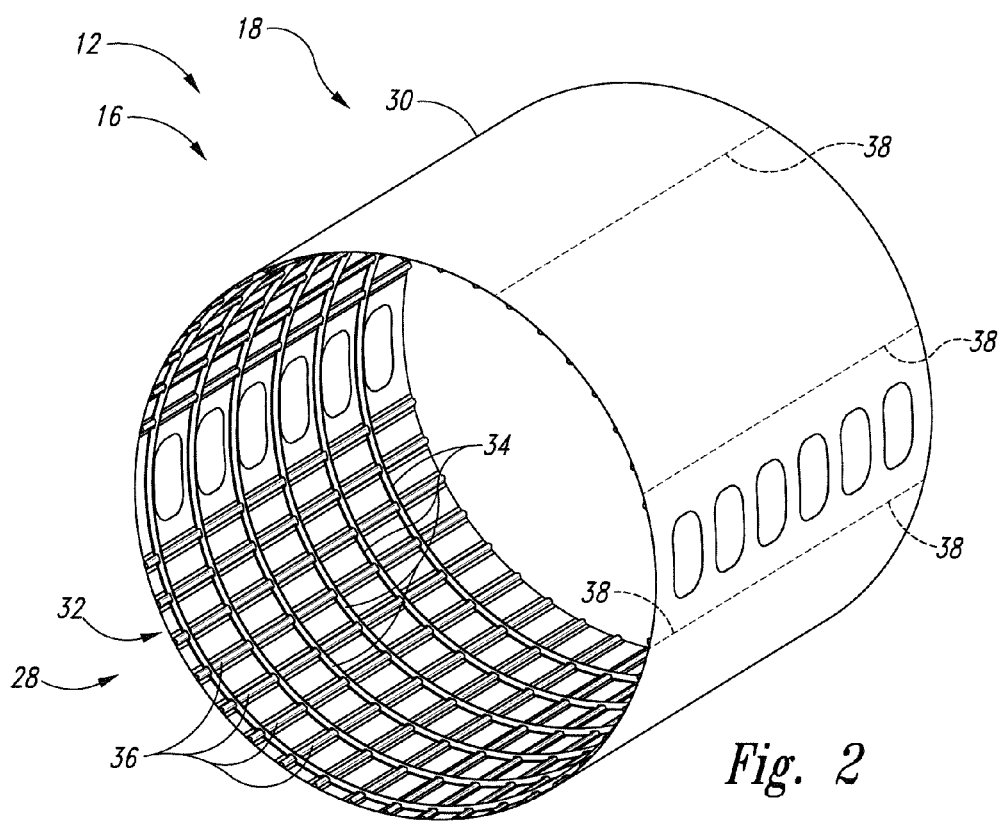
FIG. 2 is an isometric view of an illustrative, non-exclusive example of a stiffened composite structure in the form of a barrel section of an aircraft.

Stiffened composite structures 12 according to the present disclosure generally encompass structures that are defined by a structural frame 28 and a skin 30 that is operatively coupled to and supported by the structural frame 28. FIG. 2 depicts an illustrative, non-exclusive example of a stiffened composite structure 12 in the form of a barrel section 18 of a fuselage 16 of an aircraft 14. The skin 30 may be described as defining the outer shape of the fuselage 16. As indicated in FIG. 2, structural frames 28 include a plurality of stiffeners 32 operatively coupled to the inner side of the skin 30. In the example of fuselage 16, the stiffeners 32 include a plurality of frame members, or frames, 34 that are operatively coupled to and that extend circumferentially around the inner side of the skin 30 and that are spaced longitudinally along the fuselage 16. The stiffeners 32 also include a plurality of stringers 36 that are operatively coupled to and that extend longitudinally along the inner side of the skin 30 and that are spaced circumferentially around the fuselage 16. In some embodiments of stiffened composite structures 12, although not required, the skin 30 may be constructed of a plurality of skin segments 38 that collectively define the skin 30, or at least a portion of the skin 30 of a stiffened composite structure 12.

Figure 3:
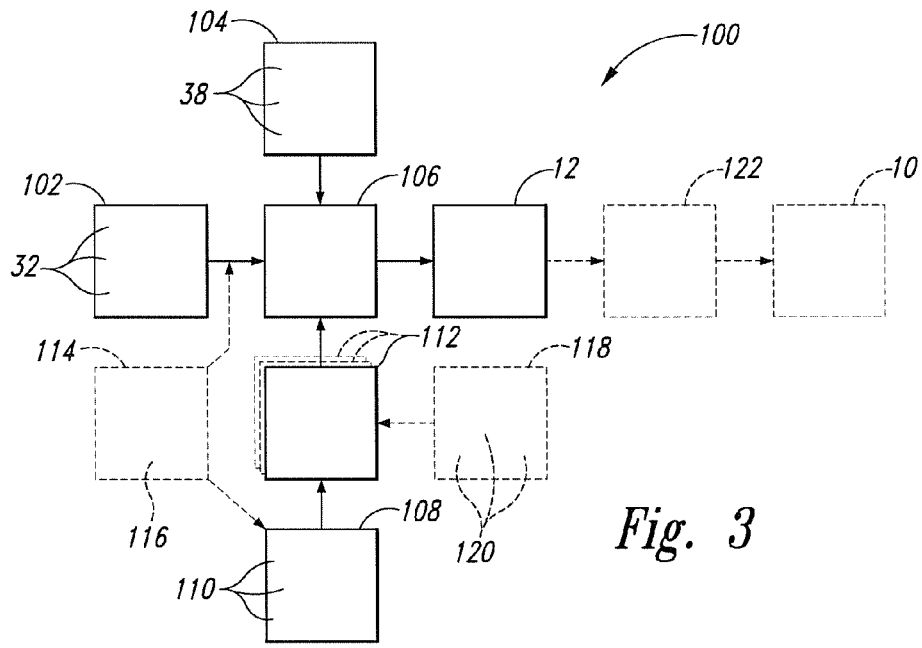
FIG. 3 is a schematic diagram representing systems for assembling stiffened composite structures.
Figure 4:
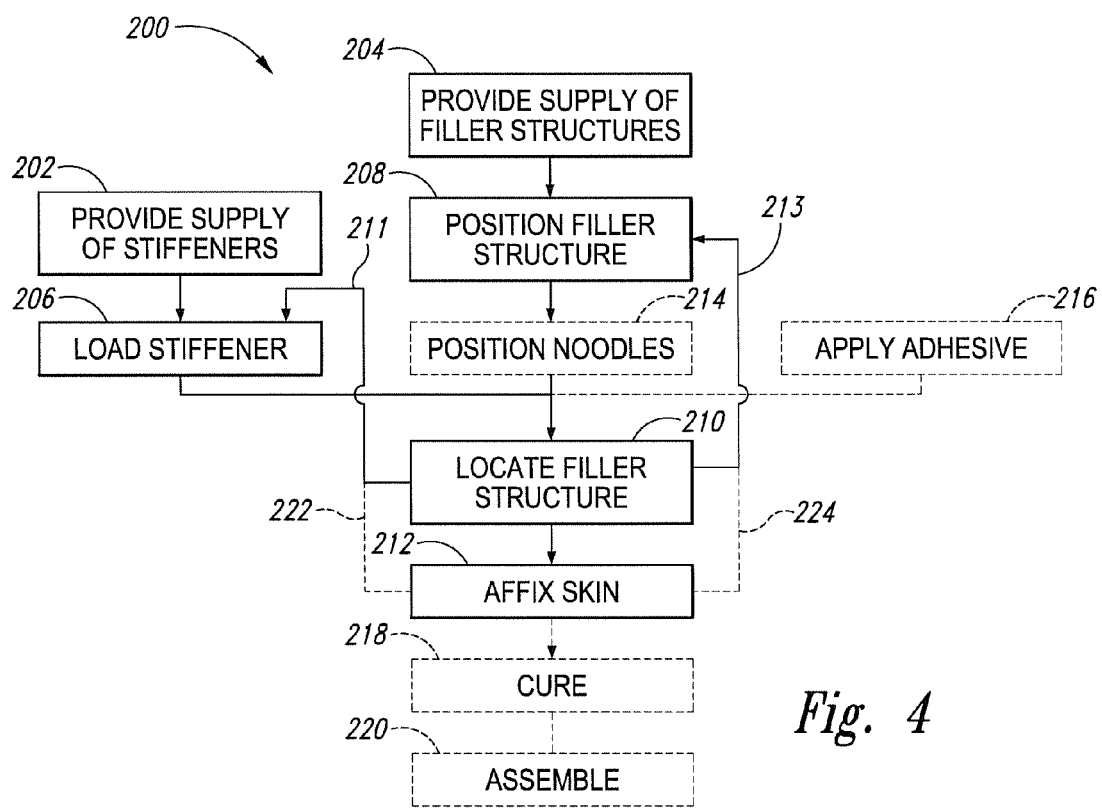
FIG. 4 is a flowchart schematically representing methods of assembling stiffened composite structures.

FIG. 3 provides a schematic representation of illustrative, non-exclusive examples of systems 100 for assembling composite structures 12, FIG. 4 provides a flowchart schematically representing illustrative, non-exclusive examples of methods 200 for assembling composite structures 12, and FIGS. 5-9 provide somewhat less schematic but still non-exclusive examples of component parts of systems 100, such as that perform and/or are utilized in connection with the performance of one or more steps of methods 200. FIG. 3 additionally or alternatively may be described as schematically representing, or illustrating, the flow of materials through a manufacturing facility, with the flow of materials ultimately resulting in a stiffened composite structure 12, and optionally resulting in a fully assembled apparatus 10. In FIGS. 3-9, some elements are illustrated in dashed lines, schematically representing that such elements may be optional or may correspond to an optional version of a system 100 and/or method 200. That said, not all systems 100 and methods 200 are required to include the elements illustrated in solid lines. The schematic representation of systems 100 and methods 200 in FIGS. 3-9 are not limiting and other systems 100, component parts of systems 100, methods 200, and steps of methods 200 are within the scope of the present disclosure, including systems 100 having greater than or fewer than the number of illustrated elements, as well as methods 200 having greater than or fewer than the number of illustrated steps, as understood from the discussions herein. As also understood from the discussions herein, methods 200 are not required to have the schematically represented steps of FIG. 4 performed in the order illustrated.

With initial reference to FIG. 3, a system 100 may include a supply 102 of stiffeners 32, a supply 104 of skin segments 38, an inner mold line layup mandrel 106, a supply 108 of filler structures 110, and a filler location tool 112. Additionally, in some embodiments, a system 100 further may include a supply 114 of adhesive 116, a supply 118 of radius fillers, or noodles, 120, and/or a curing oven or autoclave 122.

Figure 5:
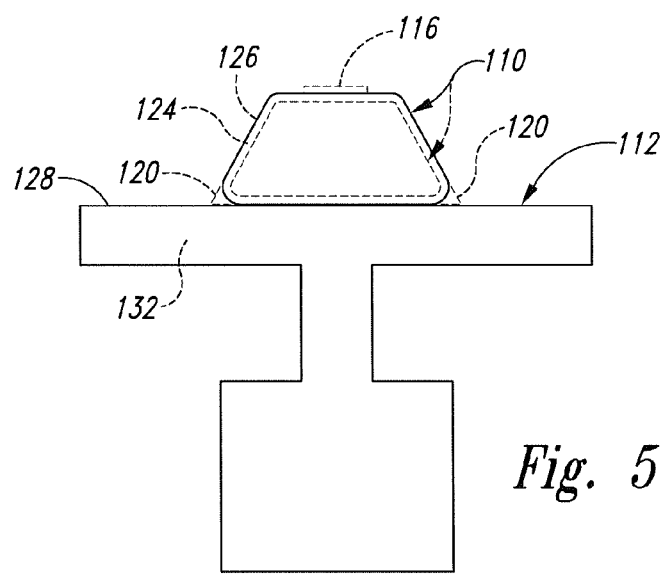
FIG. 5 is a schematic end view representing a filler insertion tool, together with a filler structure and optional noodles.

With reference to FIGS. 5-9, which represent illustrative, non-exclusive examples of component parts of a system 100, a filler structure 110 is a structure that is configured to be located, or positioned, within a cavity 40 that is defined by a stiffener 32, so that a skin segment 38 operatively may be affixed to a plurality of stiffeners 32 that are loaded on the inner mold line layup mandrel 106. For example, in the schematically illustrated example, the stiffeners 32 are hat-shaped stringers 36 that each defines a stiffener cavity 40 for location of a corresponding filler structure 110. A filler location tool 112 is a tool that is configured to locate, or position, a respective filler structure 110 from the supply 108 of filler structures 110 within a respective stiffener cavity 40 of a respective stiffener 32 that is loaded onto the inner mold line layup mandrel 106. Filler structures 110 additionally or alternatively may be described as mandrels, stringer mandrels, cure mandrels, stringer cure mandrels, bladders, stringer bladders, and/or stringer cure bladders 110. Typically, although not required, filler structures 110 are constructed of rubber or a rubber-like material and in some applications may include a breather sock 124 extending over the filler structure's body, and heat shrink material 126 extending over the breather sock 124, as schematically represented in FIG. 5.

Adhesive 116, when utilized, may take any suitable form, and may be configured to operatively affix filler structures 110 within the cavities 40 of stiffeners 32. A curing oven or autoclave 122 is a tool that is configured to receive a stiffened composite structure 12, or portion thereof, and to cure the stiffened composite structure 12, or portion thereof.

Some embodiments of stiffened composite structures 12, including the skin 30 and the stiffeners 32, may be constructed of fiber reinforced composite material. Fiber reinforced composite materials additionally or alternatively may be described as or referred to as fiber reinforced polymers, or plastics. As used herein, a fiber reinforced composite material should be understood to include at least an epoxy or other polymer or binding material together with fibers, such as (but not limited to) carbon fibers, boron fibers, para-ara mid (e.g., Kevlar®) fibers, and/or other fibers. In some embodiments, the fibers may be woven into a fabric. In some embodiments, the skin 30 and/or the stiffeners 32 may be constructed of multiple layers, or plies, of fiber reinforced composite material. In some such embodiments, the plies may be pre-preg plies, which are layers, or sheets, of fibers that are pre-impregnated with the associated binding material. Accordingly, multiple pre-preg plies may be layered to collectively define a segment of fiber reinforced composite material having desired properties and characteristics. The binding material of pre-preg plies may be partially cured, or pre-cured, so as to permit handling of the plies and selective assembly of the plies. Typically, partially cured pre-preg plies are tacky to the touch and therefore easily stick together when layered, but not necessarily in a permanent fashion. That is, when layered, two adjacent plies may be permitted to translate laterally relative to each other and/or may be able to be separated, if so desired. To more permanently affix adjacent layers of plies together, the layered plies may be compacted, or compressed, together, utilizing any suitable method and at any suitable and various times during the construction of a fiber reinforced composite structure. This compression of two or more layers is referred to as compaction, or as compacting, of the plies. The term "compacting" also may be used to describe the adhering, mounting, or otherwise affixing of a tool, such as a filler structure 110, to a composite structure 12, such as a stiffener 32.

Turning now to FIG. 4, but with continued reference to FIG. 3 and FIGS. 5-9, a method 200 of assembling a stiffened composite structure 12 may include providing a supply 102 of stiffeners 32, as indicated at 202; providing a supply 108 of filler structures 110, as indicated at 204; loading a respective stiffener 32 from the supply 102 of stiffeners 32 onto the inner mold line layup mandrel 106, as indicated at 206; positioning a respective filler structure 110 from the supply 108 of filler structures 110 on an upper side 128 of a filler location tool 112, as indicated at 208; and then following the loading 206 and the positioning 208, locating, with the filler location tool 112, the respective filler structure 110 within the stiffener cavity 40 of the respective stiffener 32, as indicated at 210. Then, as schematically indicated in FIG. 4 at 211, the loading 206 is repeated with a subsequent stiffener 32, and, as schematically indicated at 213, the positioning 208 and locating 210 also are repeated with a subsequent filler structure 110, so that a plurality of stiffeners 32 become loaded on the inner mold line layup mandrel 106 and a plurality of filler structures 110 are located within the stiffener cavities 40 of the plurality of loaded stiffeners 32. Next, following the repeating 211 and 213, a skin segment 38 is affixed over the plurality of filler structures 110 and to the plurality of stiffeners 32 that are loaded onto the inner mold line layup mandrel 106, as indicated at 212, resulting in at least a portion of a stiffened composite structure 12 being formed on the inner mold line layup mandrel 106.

Figure 6:
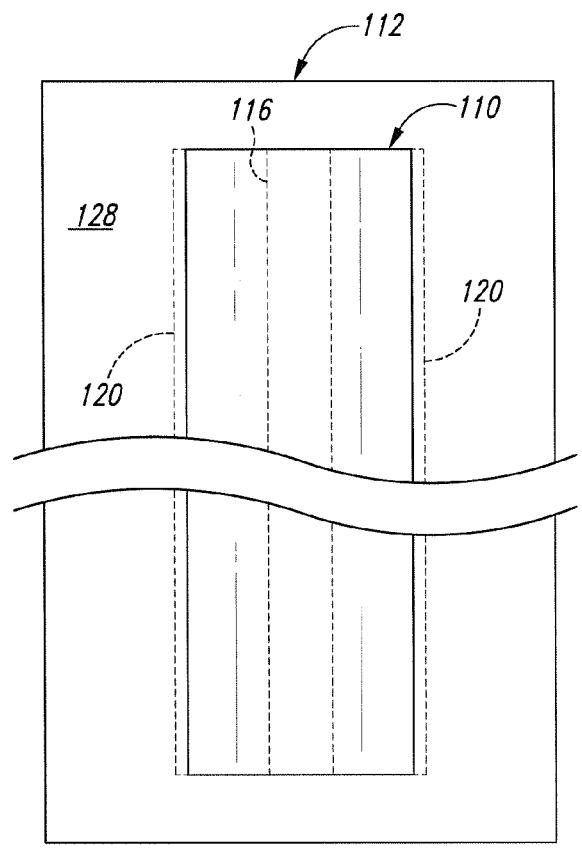
FIG. 6 is a schematic top view of the filler insertion tool, filler structure, and optional noodles of FIG. 5.
Figure 7:
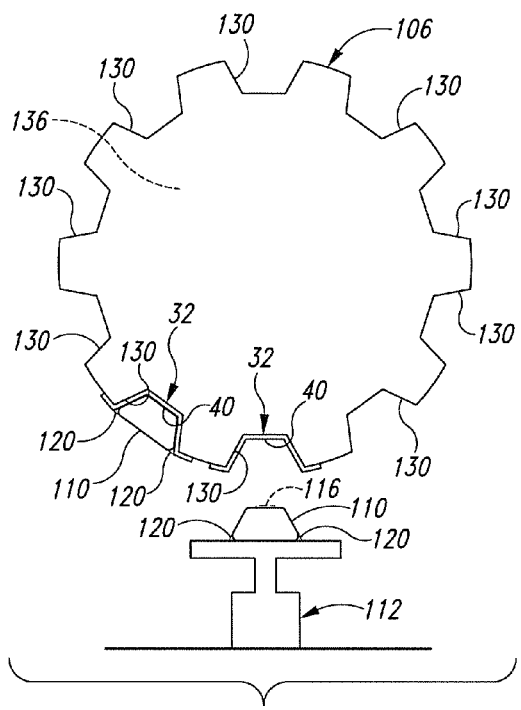
FIG. 7 is a schematic end view of the filler insertion tool, filler structure, and optional noodles of FIGS. 5-6, positioned underneath an inner mold line layup mandrel and loaded stiffener for locating of the filler structure and noodles within the respective stiffener cavity.
Figure 8:
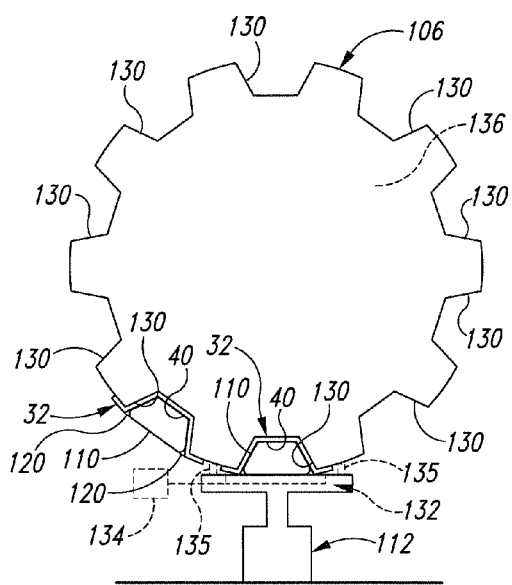
FIG. 8 is another schematic end view of the filler insertion tool, filler structure, optional noodles, inner mold line layup mandrel, and stiffener of FIG. 7, showing operative location and optional compaction of the filler structure and noodles within the stiffener cavity.

FIGS. 5-6 schematically illustrate a filler structure 110 operatively positioned on the upper surface 128 of the filler location tool 112. FIGS. 7-8 schematically illustrate two stiffeners 32 loaded on the inner mold line layup mandrel 106, with one filler structure 110 having already been located within the cavity 40 of one of the loaded stiffeners 32. In FIG. 7, the filler location tool 112 is operatively positioned underneath the inner mold line layup mandrel 106 so that a second filler structure 110 may be appropriately located within the cavity 40 of a second stiffener 32. In FIG. 8, the filler location tool 112 has raised the filler structure 110 into the cavity 40 of the second stiffener 32. Accordingly, in some methods 200, the locating 210 may be described as including positioning the filler location tool 112 vertically underneath the inner mold line layup mandrel 106, and raising the respective filler structure 110 with the filler location tool 112.

Figure 9:
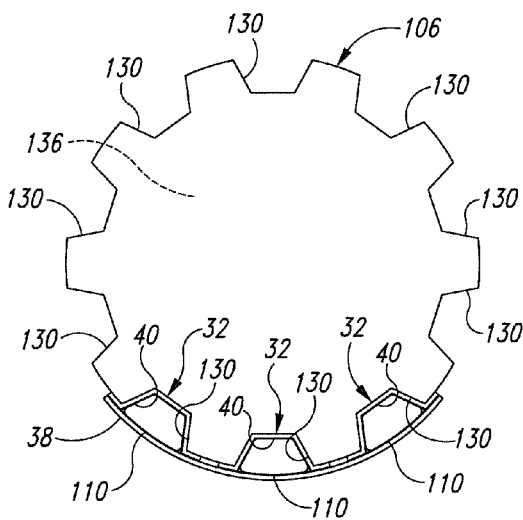
FIG. 9 is a schematic end view of an inner mold line layup mandrel with a plurality of stiffeners and a skin segment loaded thereon, together with corresponding filler structures located within the stiffeners' cavities.

In the illustrated example of FIGS. 7-9, an illustrative, non-exclusive example of an inner mold line layup mandrel 106 is presented schematically and is generally cylindrical, corresponding to a generally cylindrical stiffened composite structure 12 that includes a plurality of hat-shaped stiffeners 32 in the form of stingers 36 that extend longitudinally along and that are spaced circumferentially around the stiffened composite structure 12; however, as discussed herein, other configurations of stiffened composite structures 12, and thus of corresponding systems 100 and component parts thereof, are within the scope of the present disclosure. With reference to the illustrative, non-exclusive schematic example of FIGS. 7-9, an inner mold line layup mandrel 106 may be described as including a plurality of spaced-apart stiffener forms 130, with each stiffener form 130 having an outer surface that corresponds to one side of a respective stiffener 32 that is to be loaded into a respective stiffener form 130. Accordingly, in some methods 200, the loading 206 may include loading a stiffener 32 onto, or within, a respective stiffener form 130. The schematic representation of the inner mold line layup mandrel 106 is not illustrated to scale, and as an illustrative, non-exclusive example, an inner mold line layup mandrel 106 that is configured for assembly of fuselages 16 may include more than 20, more than 50, more than 75, or even more than 100 stiffener forms 130 corresponding to a plurality of stingers 36.

As indicated at 214 in FIG. 4, some methods 200 optionally further include prior to the locating 210, positioning a noodle or noodles 120 along the longitudinal edges of the filler structure 110 to be located. The placement of optional noodles 120 also is schematically illustrated in FIGS. 5-6 on the upper surface 128 of the filler location tool 112. It also is within the scope of the present disclosure that the operative positioning of noodles 120 may occur after the respective filler structure 110 has been located within the cavity 40 of a stiffener 32 on the inner mold line layup mandrel 106. Additionally or alternatively, in some methods 200, the positioning 208 of a filler structure 110 may be described as including the positioning 214 of noodles 120. Additionally or alternatively, in some systems 100 and methods 200, the noodles 120 may be considered a component part of a filler structure 110. That is, a filler structure 110 may include noodles 120. Moreover, it is within the scope of the present disclosure that a filler structure 110 be suitably shaped, or otherwise configured, so that no noodles 120 are required.

Some methods 200 optionally include prior to the locating 210, applying an adhesive 116 to an upper side of the filler structure 110, as indicated in FIG. 4 at 216. Accordingly, the locating 210 may be described as including adhering the filler structure 110 within the stiffener cavity 40 of the respective stiffener 32. In some systems 100 and methods 200, the adhesive 116 may take the form of an adhesive strip, such as schematically illustrated in FIGS. 5-7.

Additionally or alternatively, as schematically and optionally represented in FIG. 3, in some systems 100 and methods 200, the adhesive 116 may be applied to the cavity 40 of a stiffener 32 that is loaded or to be loaded on the inner mold line layup mandrel 106.

In some methods 200, the locating 210 may include compacting a located filler structure 110 within the cavity 40 of the respective stiffener 32. That is, in some systems 100, the filler location tool 112 may include compaction structure 132 that is configured to compact an associated filler structure 110 within the cavity 40 of the respective stiffener 32. For example, in embodiments in which the filler location tool 112 is configured to raise the filler structure 110, the compaction structure 132 simply may impart a compaction force to the filler structure 110, which in turn imparts a compaction force to the stiffener 32. When an adhesive 116 is used, this compaction force may ensure the adhesion of the filler structure 110 within the stiffener cavity 40. Alternatively, the compaction structure 132 may be configured to vacuum compact the filler structure 110 within the stiffener cavity 40. In FIG. 8, the optional compaction structure 132 is schematically illustrated as including a vacuum system 134 and a seal 135. With the seal 135 operatively engaged with the inner mold line layup mandrel 106, the vacuum system 134 operatively draws air from the interface between the filler location tool 112 and the inner mold line layup mandrel 106. Accordingly, when activated, the vacuum system 134 operatively may suction the filler structure 110 within the stiffener cavity 40, resulting in the compaction of the filler structure 110 and optionally also of the stiffener 32. In some such systems 100 and methods 200, the filler location tool 112 may raise the filler structure 110 to a position that is spaced away from engagement with the stiffener 32, and then the vacuum compacting may operatively suction the filler structure 32 within the stiffener cavity 40.

Some methods 200 optionally include rotating the inner mold line layup mandrel 106 to position the inner mold line layup mandrel 106 after the loading 206 and the locating 210 for subsequent loading of a subsequent stiffener 32 and locating of a subsequent filler structure 110. FIGS. 7-8 schematically represent the locating of a subsequent filler structure 110 after an initial stiffener 32 has been loaded and a corresponding initial filler structure 110 has been located within the initial stiffener's cavity 40, and thus after the inner mold line layup mandrel 106 has been rotated. Accordingly, in some systems 100, the inner mold line layup mandrel 106 may be described as including rotation structure 136 that is configured to rotate the inner mold line layup mandrel 106 after each loading 206 of a stiffener 32 and locating 210 of a filler structure 110.

The loading 206 of stiffeners 32 may be performed utilizing any suitable structures, tools, and methods, including (but not limited to) those disclosed in co-owned U.S. patent application Ser. No. 13/732,961 filed on Jan. 2, 2013 and entitled SYSTEMS AND METHODS FOR ASSEMBLING STIFFENED COMPOSITE STRUCTURES, the complete disclosure of which is incorporated herein by reference. Similarly, the affixing 212 of skin segments 38 may be performed utilizing any suitable structures, tools, and methods, including (but not limited to) those disclosed in co-owned U.S. patent application Ser. No. 13/693,887 filed on Dec. 4, 2012 and entitled SYSTEMS AND METHODS FOR ASSEMBLING A SKIN OF A COMPOSITE STRUCTURE, the complete disclosure of which is incorporated herein by reference.

As schematically illustrated in the flowchart of FIG. 4, the loading 206 and the positioning 208 may be performed parallel to, or concurrently with, each other during the assembly of a stiffened composite structure 12. For example, while a first stiffener 32 is being loaded onto the inner mold line layup mandrel 106, a filler structure 110 may be appropriately positioned on a filler location tool 112. The filler structure 110 that is being positioned at the same time as the loading of a stiffener 32 may or may not be the filler structure 110 that will be located in that stiffener 32. For example, it is within the scope of the present disclosure that a system 100 includes more than one filler location tool 112, as well as more than one tool that is configured to load stiffeners 32. As a result, an efficient assembly of a stiffened composite structure 12 may be realized.

As optionally and schematically indicated in FIG. 4 at 218, some methods 200 further may include following the affixing 212, curing the stiffened composite structure 12, for example, in a curing oven or autoclave 122 of a system 100.

As discussed, some apparatuses 10 may include several stiffened composite structures 12 that are assembled together to collectively define the apparatus 10 or a greater stiffened composite structure 12. Aircraft 14 and fuselages 16 are such examples, with an illustrative, non-exclusive example of a fuselage 16 having more than one barrel section 18. Accordingly, as optionally and schematically indicated in FIG. 4, some methods 200 further may include following the affixing, again repeating the loading 206, as indicated at 222, and the positioning 208 and locating 210, as indicated at 224, as many times as necessary to form another portion of a stiffened composite structure 12. Following the formation of multiple formed portions of a stiffened composite structure 12, the multiple formed portions may be assembled together, as indicated at 220. Depending on the size of the stiffened composite structure 12 and/or the portions thereof, each portion may be cured prior to final assembly, or multiple portions may first be assembled and then the entire assembly may be cured.

Figure 10:
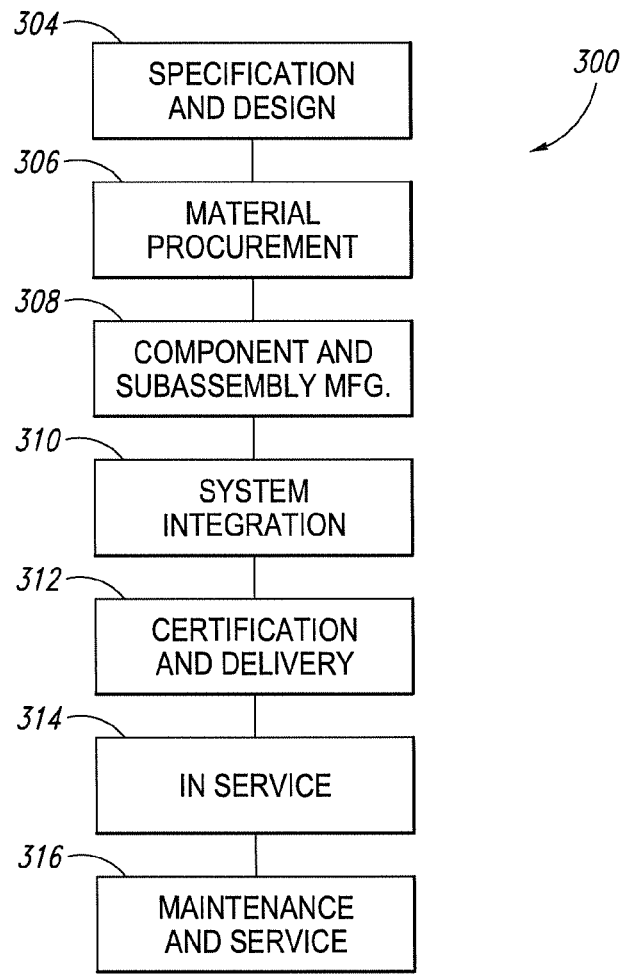
FIG. 10 is a flowchart schematically representing aircraft production and service methodology.
Figure 11:
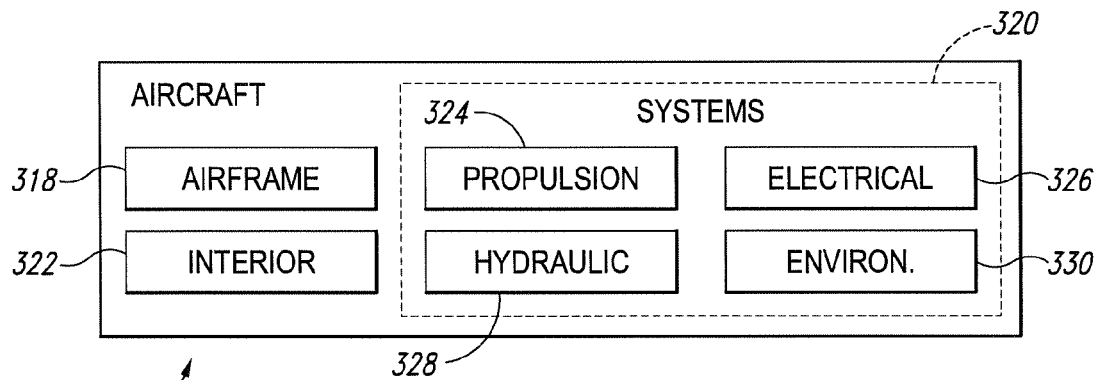
FIG. 11 is a block diagram schematically representing an aircraft.

Turning now to FIGS. 10-11, embodiments of the present disclosure may be described in the context of an aircraft manufacturing and service method 300 as shown in FIG. 10 and an aircraft 14 as shown in FIG. 11. During pre-production, exemplary method 300 may include specification and design 304 of the aircraft 14 and material procurement 306. During production, component and subassembly manufacturing 308 and system integration 310 of the aircraft 14 takes place. Thereafter, the aircraft 14 may go through certification and delivery 312 in order to be placed in service 314. While in service by a customer, the aircraft 14 is scheduled for routine maintenance and service 316 (which may also include modification, reconfiguration, refurbishment, and so on).

Each of the processes of method 300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 11, the aircraft 14 produced by exemplary method 300 may include an airframe 318 with a plurality of systems 320 and an interior 322. Examples of high-level systems 320 include one or more of a propulsion system 324, an electrical system 326, a hydraulic system 328, and an environmental system 330. Any number of other systems also may be included. Although an aerospace example is shown, the principles of the inventions disclosed herein may be applied to other industries, such as the automotive industry.

Apparatus and methods disclosed herein may be employed during any one or more of the stages of the production and service method 300. For example, components or subassemblies corresponding to production process 308 may be fabricated or manufactured in a manner similar to components or subassemblies produced while the aircraft 14 is in service. Also, one or more apparatus embodiments, method embodiments, or a combination thereof may be utilized during the production stages 308 and 310, for example, by substantially expediting assembly of or reducing the cost of an aircraft 14. Similarly, one or more of apparatus embodiments, method embodiments, or a combination thereof may be utilized while the aircraft 14 is in service, for example and without limitation, to maintenance and service 316.

Illustrative, non-exclusive examples of inventive subject matter according to the present disclosure are described in the following enumerated paragraphs:

A. A method of assembling a stiffened composite structure, comprising:

providing a supply of stiffeners, wherein each stiffener defines a stiffener cavity;

providing a supply of filler structures;

loading a respective stiffener from the supply of stiffeners onto an inner mold line layup mandrel;

positioning a respective filler structure from the supply of filler structures on an upper side of a filler location tool;

following the loading and the positioning, locating, with the filler location tool, the respective filler structure within the stiffener cavity of the respective stiffener;

repeating the loading, the positioning, and the locating to load a plurality of stiffeners onto the inner mold line layup mandrel and to locate a plurality of filler structures within the stiffener cavities of the plurality of stiffeners; and following the repeating, affixing a skin segment over the plurality of filler structures and to the plurality of stiffeners loaded on the inner mold line layup mandrel to form at least a portion of the stiffened composite structure.

A1. The method of paragraph A, wherein the positioning further includes positioning a noodle along the longitudinal edges of the respective filler structure.

A2. The method of any of paragraphs A-A1, further comprising:

prior to the locating, applying an adhesive to an upper side of the respective filler structure;

wherein the locating includes adhering the respective filler structure within the stiffener cavity of the respective stiffener.

A2.1. The method of paragraph A2, wherein the adhesive includes an adhesive strip.

A3. The method of any of paragraphs A-A2.1, wherein the locating includes:

positioning the filler location tool vertically underneath the inner mold line layup mandrel; and raising the respective filler structure with the filler location tool.

A4. The method of any of paragraphs A-A3, wherein the locating includes vacuum compacting, with the filler location tool, the respective filler structure within the stiffener cavity of the respective stiffener.

A4.1 The method of paragraph A4 when depending from paragraph A3, wherein the raising stops prior to the respective filler structure operatively engaging the respective stiffener; and wherein the vacuum compacting is performed following the raising to operatively suction the respective filler structure within the stiffener cavity of the respective stiffener.

A5. The method of any of paragraphs A-A4.1, further comprising:

prior to the repeating, rotating the inner mold line layup mandrel to position the inner mold line layup mandrel for subsequent loading of a subsequent stiffener and locating of a subsequent filler structure.

A6. The method of any of paragraphs A-A5, wherein the inner mold line layup mandrel includes a plurality of spaced-apart stiffener forms, each stiffener form having an outer surface that corresponds to one side of the stiffeners; and wherein the loading includes loading the respective stiffener onto a respective stiffener form.

A7. The method of any of paragraphs A-A6, wherein the loading includes any suitable method disclosed in U.S. patent application Ser. No. 13/732,961.

A8. The method of any of paragraphs A-A7, wherein the affixing includes any suitable method disclosed in U.S. patent application Ser. No. 13/693,887.

A9. The method of any of paragraphs A-A8, wherein the loading and the positioning are performed as parallel processes, or simultaneously or concurrently, during the assembling of the stiffened composite structure.

A10. The method of any of paragraphs A-A9, further comprising:

following the affixing, curing the at least a portion of the stiffened composite structure.

A11. The method of any of paragraphs A-A10, further comprising:

following the affixing, repeating the repeating the loading, the positioning, and the locating and repeating the affixing to form a greater portion of the stiffened composite structure.

A11.1. The method of paragraph A11, further comprising:

following the repeating the repeating the loading, the positioning, and the locating and repeating the affixing, assembling a plurality of formed portions of the stiffened composite structure to form the stiffened composite structure.

A12. The method of any of paragraphs A-A11.1, wherein the stiffened composite structure includes one of a barrel section of an aircraft fuselage, an aircraft fuselage, a wing section of an aircraft, a wing of an aircraft, a stabilizer section of an aircraft, a stabilizer of an aircraft, a structural section of an aircraft, and an aircraft.

A13. The method of any of paragraphs A-A12, wherein the filler structures each include a filler structure body, a breather sock extending over the filler structure body, and heat shrink material extending over the breather sock.

A14. The method of any of paragraphs A-A13, wherein the filler structure is constructed of rubber, optionally when depending from paragraph A13, wherein the filler structure body is constructed of rubber.

A15. The method of any of paragraphs A-A14, wherein the stiffeners include stringers.

A16. The method of any of paragraphs A-A15, wherein the stiffeners are constructed of fiber reinforced composite material, and optionally of pre-preg composite plies.

A17. The method of any of paragraphs A-A16, wherein the skin segments are constructed of fiber reinforced composite material, and optionally of pre-preg composite plies.

A18. The method of any of paragraphs A-A17, wherein the method utilizes the system of any of paragraphs C-C13.

B. A stiffened composite structure constructed using the method of any of paragraphs A-A18, optionally wherein the stiffened composite structure includes one of a barrel section of an aircraft fuselage, an aircraft fuselage, a wing section of an aircraft, a wing of an aircraft, a stabilizer section of an aircraft, a stabilizer of an aircraft, a structural section of an aircraft, and an aircraft.

C. A system for assembling stiffened composite structures, comprising:
a supply of stiffeners, wherein each stiffener defines a stiffener cavity;
a supply of filler structures, wherein each filler structure is configured to be positioned within a stiffener cavity;
an inner mold line layup mandrel; and
a filler location tool configured to locate a respective filler structure from the supply of filler structures within a respective stiffener cavity of a respective stiffener that is loaded onto the inner mold line layup mandrel.

C1. The system of paragraph C, further comprising:
a supply of skin segments for loading onto the inner mold line layup mandrel, onto a plurality of stiffeners loaded on the inner mold line layup mandrel, and over a plurality of filler structures inserted within respective stiffener cavities of the plurality of stiffeners.

C1.1. The system of paragraph C1, further comprising:
a skin segment loading tool configured to load a respective skin segment from the supply of skin segments onto the inner mold line layup mandrel, onto a plurality of stiffeners loaded on the inner mold line layup mandrel, and over a plurality of filler structures located within respective stiffener cavities of the plurality of stiffeners, optionally wherein the skin segment loading tool includes any suitable structure disclosed in U.S. patent application Ser. No. 13/693,887.

C2. The system of any of paragraphs C-C1.1, further comprising:
a stiffener loading tool configured to load a respective stiffener from the supply of stiffeners onto the inner mold line layup mandrel, optionally wherein the stiffener loading tool includes any suitable structure disclosed in U.S. patent application Ser. No. 13/732,961.

C3. The system of any of paragraphs C-C2, further comprising:
a supply of adhesive configured to be applied to one side of the respective filler structure prior to the respective filler structure being located within the respective stiffener cavity, optionally wherein the supply of adhesive includes a plurality of adhesive strips.

C4. The system of any of paragraphs C-C3, wherein the filler location tool includes compaction structure that is configured to compact, optionally vacuum compact, the respective filler structure within the stiffener cavity of the respective stiffener, optionally wherein the compaction structure is configured to suction the respective filler structure within the stiffener cavity of the respective stiffener.

C5. The system of any of paragraphs C-C4, wherein the inner mold line layup mandrel includes a plurality of spaced-apart stiffener forms, each stiffener form having an outer surface that corresponds to one side of the stiffeners.

C6. The system of any of paragraphs C-C5, wherein the inner mold line layup mandrel includes rotation structure that is configured to rotate the inner mold line layup mandrel after each loading of the respective stiffener and locating of the respective filler structure within the respective stiffener cavity.

C7. The system of any of paragraphs C-C6, wherein the stiffeners are constructed of fiber reinforced composite material, and optionally of pre-preg composite plies.

C8. The system of any of paragraphs C1-C7 when depending from paragraph C1, wherein the skin segments are constructed of fiber reinforced composite material, and optionally of pre-preg composite plies.

C9. The system of any of paragraphs C-C8, wherein each filler structure includes a filler structure body, a breather sock extending over the filler structure body, and heat shrink material extending over the breather sock.

C10. The system of any of paragraphs C-C9, wherein the filler structure is constructed of rubber or rubber-like material, optionally when depending from paragraph C9, wherein the filler structure body is constructed of rubber or rubber-like material.

C11. The system of any of paragraphs C-C10, further comprising:
a curing oven or autoclave configured to receive the stiffened composite structure and to cure the stiffened composite structure.

C12. The system of any of paragraphs C-C11, wherein the system is used to perform the method of any of paragraphs A-A18.

C13. The system of any of paragraphs C-C12, wherein the system is configured to construct one of a barrel section of an aircraft fuselage, an aircraft fuselage, a wing section of an aircraft, a wing of an aircraft, a stabilizer section of an aircraft, a stabilizer of an aircraft, a structural section of an aircraft, and an aircraft.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

In the event that any of the patent documents that are incorporated by reference herein define a term in a manner that is inconsistent with either the non-incorporated disclosure of the present application or with any of the other incorporated patent documents, the non-incorporated disclosure of the present application shall control with respect to the present application, and the term or terms as used in an incorporated patent document shall only control with respect to the document in which the term or terms are defined.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A method of assembling a stiffened composite structure, comprising:
   providing a supply of stiffeners, wherein each stiffener defines a stiffener cavity;
   providing a supply of filler structures;
   loading a respective stiffener from the supply of stiffeners onto an inner mold line layup mandrel;
   positioning a respective filler structure from the supply of filler structures on an upper side of a filler location tool and positioning a noodle along the longitudinal edges of the respective filler structure;
   applying an adhesive strip to an upper side of the respective filler structure;
   following the loading, the positioning, and the applying, locating, with the filler location tool, the respective filler structure within the stiffener cavity of the respective stiffener, wherein the locating includes:
      positioning the filler location tool vertically underneath the inner mold line layup mandrel;
      raising the respective filler structure with the filler location tool to a position prior to engagement with the respective stiffener;
      suctioning, with the filler location tool, the filler structure within the stiffener cavity of the respective stiffener; and
      adhering the respective filler structure within the stiffener cavity of the respective stiffener;
   following the loading, the positioning, the applying, and the locating, rotating the inner mold line layup mandrel to position the inner mold line layup mandrel for subsequent loading of a subsequent stiffener and subsequent locating of a subsequent filler structure;
   following the rotating, repeating the loading, the positioning, the applying, and the locating to load a plurality of stiffeners onto the inner mold line layup mandrel and to locate a plurality of filler structures within the stiffener cavities of the plurality of stiffeners; and
   following the repeating, affixing a skin segment over the plurality of filler structures and to the plurality of stiffeners loaded on the inner mold line layup mandrel to form at least a portion of the stiffened composite structure;
   wherein the loading and the positioning are performed as parallel processes during the assembling of the stiffened composite structure.

2. A method of assembling a stiffened composite structure, comprising:
   providing a supply of stiffeners, wherein each stiffener defines a stiffener cavity;
   providing a supply of filler structures;
   loading a respective stiffener from the supply of stiffeners onto an inner mold line layup mandrel;
   positioning a respective filler structure from the supply of filler structures on an upper side of a filler location tool;
   following the loading and the positioning, locating, with the filler location tool, the respective filler structure within the stiffener cavity of the respective stiffener;
   repeating the loading, the positioning, and the locating to load a plurality of stiffeners onto the inner mold line layup mandrel and to locate a plurality of filler structures within the stiffener cavities of the plurality of stiffeners; and
   following the repeating, affixing a skin segment over the plurality of filler structures and to the plurality of stiffeners loaded on the inner mold line layup mandrel to form at least a portion of the stiffened composite structure.

3. The method of claim 2, further comprising:
   prior to the locating, applying an adhesive strip to an upper side of the respective filler structure;
   wherein the locating includes adhering the respective filler structure within the stiffener cavity of the respective stiffener.

4. The method of claim 2, wherein the locating includes:
   positioning the filler location tool vertically underneath the inner mold line layup mandrel; and
   raising the respective filler structure with the filler location tool.

5. The method of claim 4, wherein the locating includes vacuum compacting, with the filler location tool, the respective filler structure within the stiffener cavity of the respective stiffener.

6. The method of claim 5,
   wherein the raising stops prior to the respective filler structure operatively engaging the respective stiffener; and
   wherein the vacuum compacting is performed following the raising to operatively suction the respective filler structure within the stiffener cavity of the respective stiffener.

7. The method claim 2, further comprising:
   prior to the repeating, rotating the inner mold line layup mandrel to position the inner mold line layup mandrel for subsequent loading of a subsequent stiffener and locating of a subsequent filler structure.

8. The method of claim 2, wherein the loading and the positioning are performed as parallel processes during the assembling of the stiffened composite structure.

9. The method of claim 2, further comprising:
   following the affixing, repeating the repeating the loading, the positioning, and the locating and repeating the affixing to form a greater portion of the stiffened composite structure.

10. The method of claim 9, further comprising:
   following the repeating the repeating the loading, the positioning, and the locating and repeating the affixing, assembling a plurality of formed portions of the stiffened composite structure to form the stiffened composite structure.

11. The method of claim 2, wherein the stiffened composite structure includes one of a barrel section of an aircraft fuselage, an aircraft fuselage, a wing section of an aircraft, a wing of an aircraft, a stabilizer section of an aircraft, a stabilizer of an aircraft, a structural section of an aircraft, and an aircraft.

12. The method of claim 2, wherein the filler structures each include a filler structure body, a breather sock extending over the filler structure body, and heat shrink material extending over the breather sock.

13. The method of claim 2, wherein the stiffeners include stringers of an aircraft.

14. The method of claim 2, wherein the stiffeners and the skin segments are constructed of fiber reinforced composite material.

15. The method of claim 2, wherein the stiffeners and the skin segments are constructed of pre-preg composite plies.

16. The method of claim 2, wherein the positioning further includes positioning a noodle along longitudinal edges of the respective filler structure.

17. The method of claim 2, further comprising:
prior to the locating, applying an adhesive to an upper side of the respective filler structure;
wherein the locating includes adhering the respective filler structure within the stiffener cavity of the respective stiffener.

18. The method of claim 2,
wherein the inner mold line layup mandrel includes a plurality of spaced-apart stiffener forms, each stiffener form having an outer surface that corresponds to one side of the stiffeners; and
wherein the loading includes loading the respective stiffener onto a respective stiffener form.

19. The method of claim 2, further comprising:
following the affixing, curing the at least a portion of the stiffened composite structure.

20. The method of claim 2, wherein the filler structure is constructed of rubber.

\* \* \* \* \*